Jan. 26, 1932.  C. MELIDONI  1,842,533
PISTON PACKING RING
Filed Aug. 26, 1927

INVENTOR
CONSTANTINE MELIDONI
BY Joseph Blacker
ATTORNEY

Patented Jan. 26, 1932

1,842,533

UNITED STATES PATENT OFFICE

CONSTANTIN MELIDONI, OF NEW YORK, N. Y.

PISTON PACKING RING

Application filed August 26, 1927. Serial No. 215,743.

This invention relates to piston rings used for internal combustion engines and all kinds of reciprocating engines in general, and the primary object of this invention is to provide a ring construction which is extremely resilient in a radial direction and which will prevent leakage of gas or oil between the piston and the cylinder wall.

Another object of this invention is to produce a one-piece piston packing ring of the type having therein an upper and lower series of staggered horizontal slots which are cut through the ring from the outer to the inner circumferences, and which will also have a step-joint, the abutting faces of which are not cut through by any of the slots adjoining it and which will thus present the appearance of solidity of the step-cut one piece piston rings in general use at present.

Another object of this invention is to produce a one-piece piston packing ring of the type having therein an upper and lower series of staggered horizontal through slots, forming pockets in which lubricating oil may be retained all around the three hundred and sixty degrees of the circumference and means for re-enforcing the ring in an axial direction so as to prevent its collapse when the explosion pressure reaches its top face, and thereby prevent the lubricating oil from being squeezed out from the pockets within the ring.

With these and other objects in view the invention will be hereinafter more particularly described, and the combination and arrangement of parts will be shown in the accompanying drawings and pointed out in the claims which form part of this specification. It being understood that various changes in the form, proportion, size and minor details of construction within the scope of the claims, may be resorted to without departing from the spirit or sacrificing any of the advantages of the invention.

Reference will now be had to the drawings, wherein like numerals of reference designate corresponding parts throughout the several views, in which.

Figure 1:
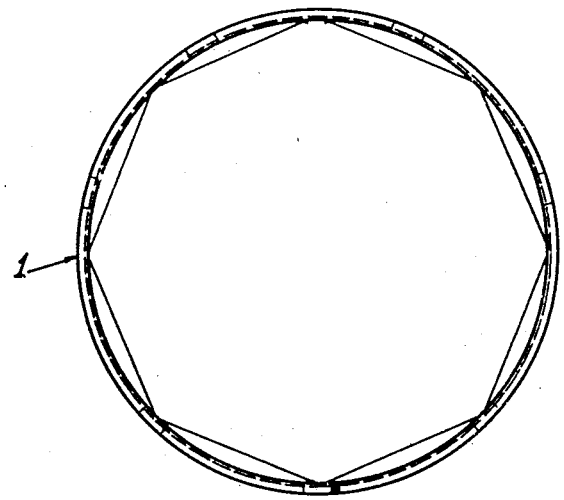
Figure 1 is a plan view of the piston packing ring.
Figure 2:
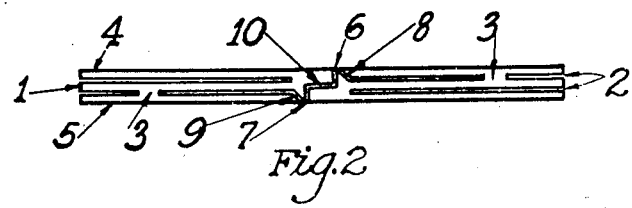
Figure 2 is a side elevation of the piston packing ring constructed in accordance with this invention.
Figure 3:
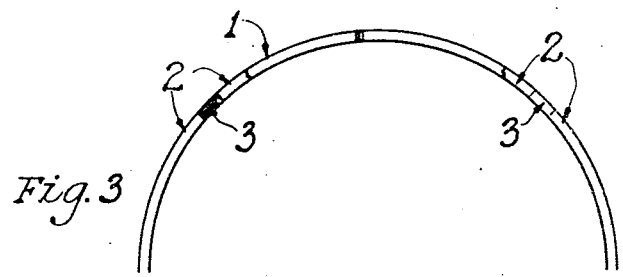
Figure 3 is a plan view of the lower face of the ring showing the ring partly in section.
Figure 4:
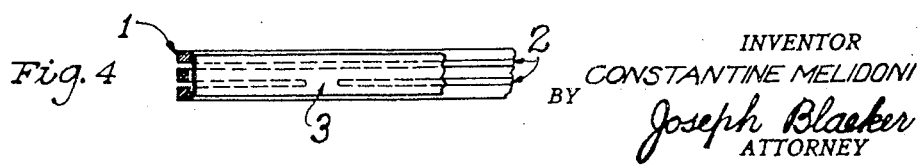
Figure 4 is an enlarged fragmentary section of the ring showing an inner ring inside the piston packing ring.

As shown in Figure 1, the radial thickness of the piston packing ring 1, is made less than is customary and this increases the resiliency of the ring in a radial direction. As shown in Figure 2, the cylinder wall engaging face of the ring is provided with an upper and lower series of staggered horizontal slots 2 which are cut through the ring from the outer to the inner circumferences.

As shown in Figure 2, these slots are spaced apart by the solid ribs 3 of the ring. These ribs in each series of slots are located substantially opposite the center of the slots of the other series. The slots are cut at right angles to the axis of the ring and parallel with both axial faces 4 and 5.

The ring as thus formed is very resilient in a radial direction and when inserted in an out-of-round cylinder, it yields outwardly and takes the shape of the cylinder wall and thus makes a tight joint in badly worn cylinders where a perfect circle ring would be absolutely useless.

With ring constructions of this type difficulties have been experienced in producing a satisfactory joint at the point where the ring is split. It has been customary to provide a step cut junction with the usual overlapping tongues and to extend one of the lower slots across the lower tongue so as to divide this tongue into two portions. A ring junction with bisected tongues is delicate. Rings of such construction are easily broken and do not fully meet the demand of the automotive industry for a replacement ring having extreme resilient properties and which shall at the same time be foolproof.

To overcome this tendency to breakage, it is necessary to leave the abutting step cut surfaces in their original solid form and this invention provides a step joint, the abutting faces of which are not cut through by any of the slots adjoining it, and which presents the appearance of solidity of the step-cut one piece piston rings in general use at present.

A best shown in Figure 2, the ring is provided with a step-junction having solid abutting faces 6 and 7, which are not cut through by the adjoining slots, the upper and lower slots on both sides of the junction stopping short of the abutting faces. One of the end slots of both the upper and lower series on opposite sides of the junction have their adjoining axial faces 4 and 5 cut through by saw cuts 8 and 9. These saw cuts are preferably inclined at an angle of about forty-five degrees with the axial faces and start at the intersections of the axial and abutting faces.

As shown at 10, the upper and lower overlapping faces of the junction are spaced apart from each other, leaving a clearance space between them.

It is thus readily seen that this ring has an axial resiliency around the circumference due to the staggered horizontal slots, that this resiliency is maintained at the junction by cutting through the axial faces of the ring, and that the overlapping faces of the junction can move closer to each other because of the clearance space between them, and these three provisions for axial resiliency cover the full three hundred and sixty degrees of the circumference.

Piston rings of the above construction are intended almost exclusively for replacement purposes on automobile motors and are to be used in worn out cylinders having tapering walls, generally smaller in diameter at the lower end of the cylinder. As the slots in these rings are always full of oil it follows that when the smaller diameter of the cylinder is reached the rings conform themselves to this smaller diameter and the oil is forced out from the slots to the cylinder wall and provides positive lubrication. This slotted ring structure is thus adapted to convey oil between the inner and outer circumferences of the ring and takes care of excessive wall pressure.

Due to the axial resiliency, the ring has a tendency to collapse when the explosive pressure reaches its top face. Such collapse would force the oil out from the slots and defeat one of the main characteristics of this invention. To prevent this axial collapse, the interior surface of the piston packing ring has been hollowed out to form a circular channel having its greatest depth midway between the axial faces, and leaving projecting circumferential edges at both axial faces. There has also been provided an inner ring which seats and presses against these circumferential edges and holds the ring tightly in place against the cylinder walls, and also re-enforces the ring in an axial direction, thereby preventing it from collapsing. When this inner ring presses against the interior piston packing ring surfaces, it moulds the piston packing ring and forces it to assume the out-of-round shape of the worn cylinder. The inner ring is of a corrugated form and these corrugations have the effect of centering the piston packing ring around the piston, thus preventing piston slap.

Having thus described my invention, I claim as new and desire to secure by Letters Patent:

1. In a one-piece piston packing ring having an upper and lower series of staggered slots extending through the ring, said ring being provided with a step-injunction having tongues of equal dimensions and with solid abutting faces, the upper and lower slots on both sides of the junction stopping short of the abutting faces, one of the end slots of the upper and lower series on opposite sides of the junction having their adjoining axial faces cut through by saw cuts which are inclined to the axial faces.

2. In a one-piece piston packing ring having an upper and lower series of staggered slots extending through the ring, said ring being provided with a step-junction having tongues of equal dimensions and with solid abutting faces, the upper and lower slots on both sides of the junction stopping short of the abutting faces, one of the end slots of the upper and lower series on opposite sides of the junction having their adjoining axial faces cut through by saw cuts which are inclined to the axial faces and which start at the intersections of the axial and abutting faces.

3. In a one-piece piston packing ring having an upper and lower series of staggered slots extending through the ring, said ring being provided with a step-junction having tongues of equal dimensions and with solid abutting faces which are not cut through by the adjoining slots, the upper and lower slots on both sides of the junction stopping short of the abutting faces, one of the end slots of the upper and lower series on opposite sides of the junction having their adjoining axial faces cut through by saw cuts which are inclined to the axial faces, the overlapping faces of the junction being spaced apart from each other.

4. A concentric piston packing ring comprising a split ring having parallel inner and outer peripheries, the space between said peripheries being perforated with an upper and lower series of staggered slots extending through the ring in spaced planes parallel to the axial faces of the ring, each axial face having on opposite sides of the split an inclined cut which extends from the respective face to the end of the adjacent slot.

5. A single split and slotted piston ring expansible diametrically and laterally having overlapping opposite ends normally separated and a lateral projection on each overlapping end opposite the tip of the other overlapping end.

6. A split and slotted piston ring expansible diamerically and laterally having overlapping opposite ends normally separated and a projection on each overlapping end opposite the tip of the other overlapping end and terminating slightly within the outer face thereof.

7. A split and slotted piston ring expansible diametrically and laterally having overlapping opposite ends normally separated and a V-shaped projection on each overlapping end opposite the tip of the other overlapping end and terminating slightly within the outer face thereof.

CONSTANTIN MELIDONI.